(No Model.) 2 Sheets—Sheet 1.

R. PLATMAN.
SEED DRILL AND FERTILIZER DISTRIBUTER.

No. 319,021. Patented June 2, 1885.

Attest.
E. N. Adams

Inventor.
Robt Platman,
per R. L. Osgood
Atty.

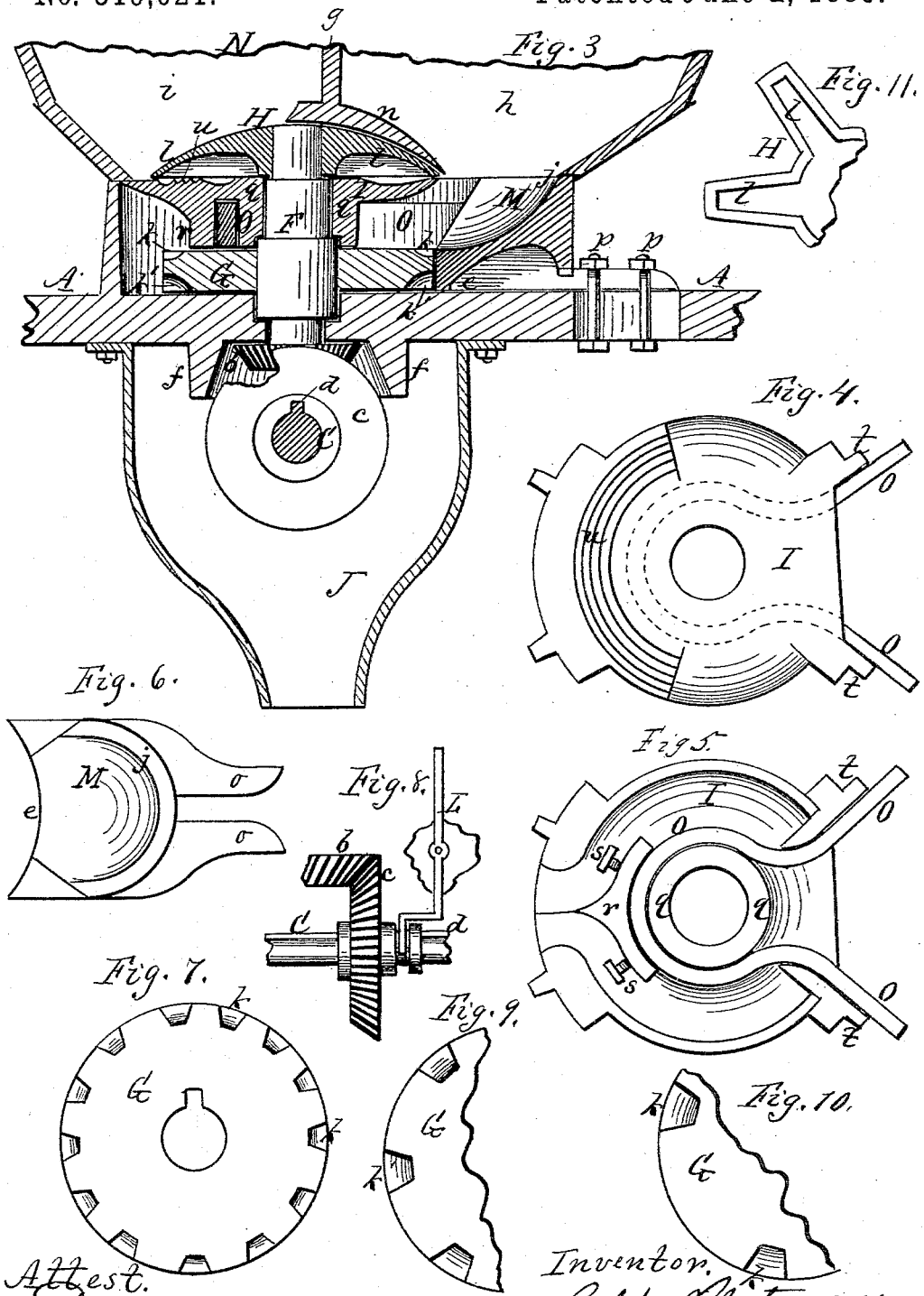

UNITED STATES PATENT OFFICE.

ROBERT PLATMAN, OF BELLONA, NEW YORK.

SEED-DRILL AND FERTILIZER-DISTRIBUTER.

SPECIFICATION forming part of Letters Patent No. 319,021, dated June 2, 1885.

Application filed April 13, 1885. (No model.)

*To all whom it may concern:*

Be it known that I, ROBERT PLATMAN, of Bellona, in the county of Yates and State of New York, have invented a certain new and useful Improvement in Seed - Planters and Fertilizer-Distributers; and I do hereby declare that the following is a full, clear, and exact description of the same, reference being had to the accompanying drawings, in which—

Figure 1:
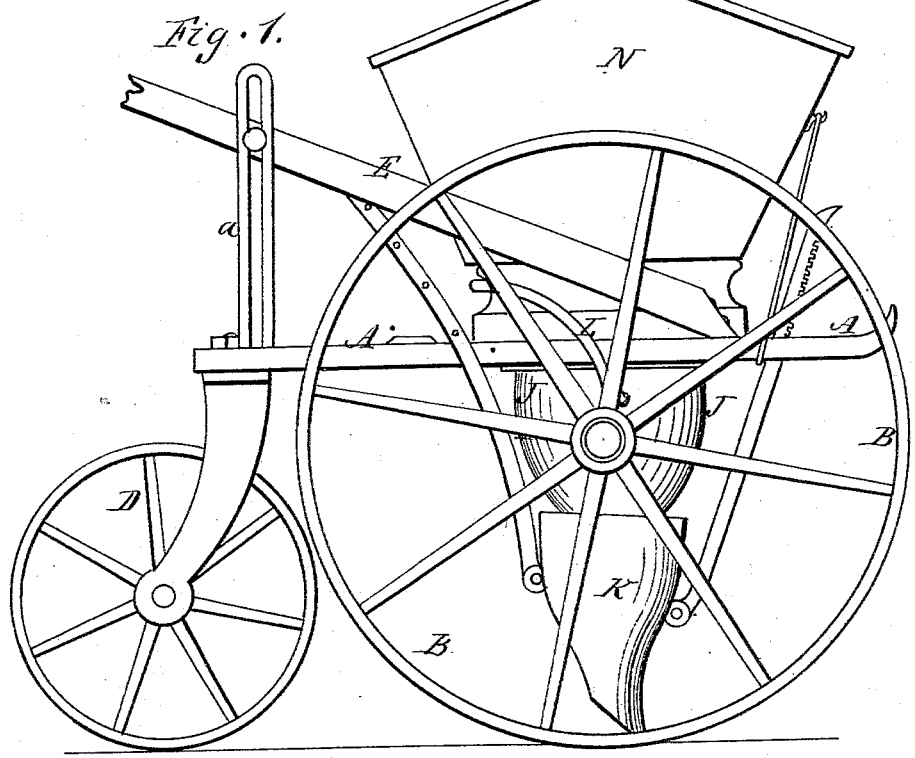
Figure 2:
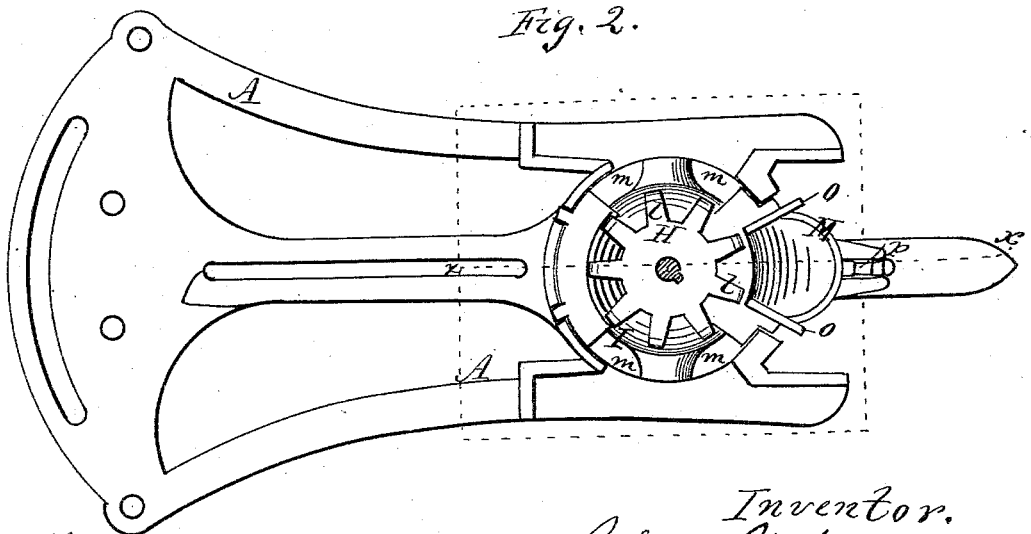

Figure 1 is an elevation of the machine. Fig. 2 is a plan (enlarged) of the bed of the machine and the operating parts with the hopper removed, the position of the hopper being shown, however, by dotted lines. Fig. 3 is an enlarged longitudinal section in line $x\,x$ of Fig. 2. Fig. 4 is a top view of the intermediate stationary disk between the seeding and fertilizer disks. Fig. 5 is a bottom view of the same. Fig. 6 is a plan of the seeding-pocket. Fig. 7 is a plan of the seeding-disk. Fig. 8 is a diagram showing an elevation of the gearing and the means for engaging and disengaging the same. Figs. 9, 10, and 11 are detail views.

My improvement relates to combined seeding-machines and fertilizer-distributers; and it consists in the following construction and arrangement.

In the drawings, A shows the bed-plate, on which the operating parts are mounted.

B B are the driving-wheels, attached to an axle, C, which receives motion with the wheels.

D is a caster-wheel in the rear, which helps to support the machine.

E E are the handles, resting at the rear in slotted standards $a\,a$, that allow vertical adjustment.

F is a vertical shaft resting and having its bearing in the bed-plate A.

G is the seeding-disk, and H is the fertilizer-distributer disk, both attached to shaft F and revolving with it, and I is a stationary disk or plate resting between the disks G H, the shaft turning freely therein.

J is the discharge-tube below the bed-plate and attached thereto, serving to receive the seeds and the fertilizing material and discharging them into the drill-tooth K.

$b$ is a bevel-pinion on the bottom of shaft F, and $c$ is a bevel-gear on the axle C, that engages therewith and transmits motion to the shaft and the seeding and distributing disks by the turning of the driving-wheels. The axle is provided with a spline or feather, $d$, and the gear $c$ slides freely on the axle, by which means the gears can be engaged and disengaged at pleasure. The gear is moved forward and back by a clutch-lever, L. The gears rest inside the discharge-tube J, which is made of considerable size. The gears are shielded from the seed and fertilizer by a cup-shaped flange, $f$, on the under side of the bed-plate.

M is the pocket for feeding the seed to the seeding-disk, and N is a hopper divided by a partition, $g$, into two compartments, $h\,i$—that at the right containing the seed, and that at the left containing the fertilizing material.

The seeding-disk G is a circular flat plate having seed-pockets $k\,k$ and $k'\,k'$ on opposite sides, of different sizes, for dropping different kinds of seeds. This disk is removable from the shaft, and it can be replaced by another having different pockets, and thus can be adapted to drilling or planting in hills.

The fertilizer-disk H, which rests at the top and directly under the hopper, is convex on top, and is provided with radial arms $l\,l$, leaving spaces between, into which the fertilizing material falls and is carried around to the sides, where it drops off through openings in the bed-plate into the discharging-tube J below. The seed carried around by the seeding-disk also falls through these side openings in the bed-plate.

That portion of the fertilizer-disk which runs under the seed-compartment $h$ of the hopper is covered by a chute, $n$, which directs the seed down into the feeding-pocket M. The latter is made in a separate casting, movable on the bed-plate, having a concave inner edge, $e$, Fig. 6, which fits the circular edge of the seeding-disk, a raised concave pocket, $j$, which receives the seed from the hopper and guides it down to the seed-pockets in the disk, and a slotted extension, $o$, in the rear, through which pass bolts $p\,p$, Fig. 3, that fasten it to the bed-plate, the bolts passing through a slot in the bed-plate, by which the casting can be adjusted forward at any time, by which means it is adapted to different seeding-disks and will make a close joint therewith that will prevent the entrance of seed therein. This is a novel feature and of much importance in a seeding-machine where the disks are interchangeable.

O is a rubber packing-strip interposed between the top of the seed-disk G and the bottom of the intermediate stationary disk, I, resting around a central hollow hub, $q$, Fig. 5, of the stationary disk, and a circular flange, $r$, being on the back side. Set-screws $s\,s$ pass through the flange and fasten the packing in place. The ends of the packing-strip extend out in front and are expanded angularly, resting between flanges $t\,t$ of the stationary disk and the sides of the pocket M. The bottom edge of this packing-strip rests closely down on the top of the seeding-disk, sweeping the same so that the seed will all be retained, except what passes into the seed-pockets, also extending around and encircling the shaft F and preventing the seed from working to the center and getting around the shaft and becoming ground up. The rear portion of the top of the stationary disk I is flat, and is provided with circumferential corrugations or ribs $u\,u$, Figs. 3 and 4, over which the flat bottom of the distributer-disk H sweeps in close contact. The under side of the distributer-disk is concaved or grooved, the grooves extending into the arms for the purpose of lessening the friction. The corrugations or ribs $u\,u$ hold the fertilizing material and cause the arms of the disk to carry it around in a circular direction to the discharge, and prevent in a great degree the material from working inward to the shaft.

By a change of disks, as described, the machine is adapted to planting corn, beans, pits, &c., and all kinds of grains.

Having described my invention, I claim—

1. In a seed-planter and fertilizer-distributer, the combination, with the seeding-disk G, distributer-disk H, and intermediate plate, I, of the rubber packing-strip O, set edgewise on the under side of the intermediate plate, bearing on top of the seed-disk, making a circuit around the shaft of the disks at the rear, and expanding in front to allow entrance of the seed to the seeding-disk, as herein shown and described.

2. In a seed-planter and fertilizer-distributer, the combination of the seed-disk G, the fertilizer-disk H, the intermediate stationary plate, I, and rubber packing-ring O, the intermediate plate being flat on the top at the rear and provided with the circumferential corrugations or ribs $u\,u$, as and for the purpose specified.

3. The combination of the seed-disk G, the fertilizer-disk H, the intermediate stationary plate, I, the rubber packing-ring O, and the separate seed-pocket M, arranged to operate in the manner and for the purpose specified.

In witness whereof I have hereunto signed my name in the presence of two subscribing witnesses.

ROBERT PLATMAN.

Witnesses:
R. F. OSGOOD,
WM. J. MCPHERSON.